(12) United States Patent
Sawada

(10) Patent No.: US 10,708,516 B2
(45) Date of Patent: Jul. 7, 2020

(54) GHOST REDUCING DEVICE WITH MULTIPLE DIAPHRAGM BLADES FOR BLOCKING LIGHT FOR REDUCING GHOST, IMAGING DEVICE PROVIDED THEREWITH, GHOST REDUCING METHOD, AND IMAGING OPTICAL SYSTEM

(71) Applicant: KAMUY Innovation Corporation, Sapporo-shi, Hokkaido (JP)

(72) Inventor: Yasuhiro Sawada, Sapporo (JP)

(73) Assignee: KAMUY INNOVATION CORPORATION, Sapporo-shi, Hokkaido (JP)

( * ) Notice: Subject to any disclaimer, the term of this patent is extended or adjusted under 35 U.S.C. 154(b) by 91 days.

(21) Appl. No.: 16/064,948

(22) PCT Filed: Nov. 24, 2016

(86) PCT No.: PCT/JP2016/084772
§ 371 (c)(1),
(2) Date: Jun. 21, 2018

(87) PCT Pub. No.: WO2017/110355
PCT Pub. Date: Jun. 29, 2017

(65) Prior Publication Data
US 2019/0058820 A1 Feb. 21, 2019

(30) Foreign Application Priority Data

Dec. 24, 2015 (JP) .................. 2015-251675

(51) Int. Cl.
*H04N 5/225* (2006.01)
*H04N 5/238* (2006.01)
(Continued)

(52) U.S. Cl.
CPC ......... *H04N 5/238* (2013.01); *G02B 27/0018* (2013.01); *G03B 9/06* (2013.01); *G03B 11/00* (2013.01); *G03B 11/045* (2013.01)

(58) Field of Classification Search
CPC .... H04N 5/225; H04N 5/238; G02B 27/0018; G03B 9/06; G03B 11/00
(Continued)

(56) References Cited

U.S. PATENT DOCUMENTS

2009/0116832 A1* 5/2009 Azuma ................... G03B 9/06
396/510
2014/0255019 A1* 9/2014 Muramatsu ............. G03B 9/40
396/505

(Continued)

FOREIGN PATENT DOCUMENTS

JP   H8-334725 A   12/1996
JP   H10-62669 A   3/1998
(Continued)

*Primary Examiner* — Usman A Khan
(74) *Attorney, Agent, or Firm* — Muncy, Geissler, Olds & Lowe, P.C.

(57) ABSTRACT

[Subject(s)] To offer a ghost reducing device and an imaging device provided with it, a ghost reducing method, and an imaging optical system that can effectively reduce ghosts in a situation where ghosts can easily occur, and suppress deterioration in image quality in a situation where ghosts can hardly occur.
[Means to Solve] A ghost reducing device includes multiple diaphragm blades that are formed in the vicinity of the pupil position in an imaging optical system and form at least one opening that lets light pass through, a diaphragm blade drive means that drives the diaphragm blades to adjust the size and/or position of the opening, and a control means that controls the driving of the diaphragm blades by the diaphragm blade drive means, wherein the control means controls the driving so that the diaphragm blades totally block the light in the symmetrical position to the opening with respect to the optical axis of the imaging optical system.

11 Claims, 12 Drawing Sheets

(51) Int. Cl.
  *G03B 11/04*  (2006.01)
  *G03B 11/00*  (2006.01)
  *G02B 27/00*  (2006.01)
  *G03B 9/06*  (2006.01)

(58) Field of Classification Search
  USPC .......................................................... 348/335
  See application file for complete search history.

(56) References Cited

U.S. PATENT DOCUMENTS

| | | | |
|---|---|---|---|
| 2014/0320686 A1* | 10/2014 | Hjelmstrom | H04N 5/2351 348/218.1 |
| 2015/0346583 A1* | 12/2015 | Yoshizawa | G03B 9/14 396/449 |
| 2016/0178989 A1* | 6/2016 | Ochi | G03B 9/06 396/510 |
| 2018/0356708 A1* | 12/2018 | Takigami | G03B 5/00 |

FOREIGN PATENT DOCUMENTS

| | | |
|---|---|---|
| JP | 2007-212745 A | 8/2007 |
| JP | 2008-122712 A | 5/2008 |
| JP | 2014-217059 A | 11/2014 |
| JP | 2015-228966 A | 12/2015 |

* cited by examiner

Fig. 6
(a) Open State
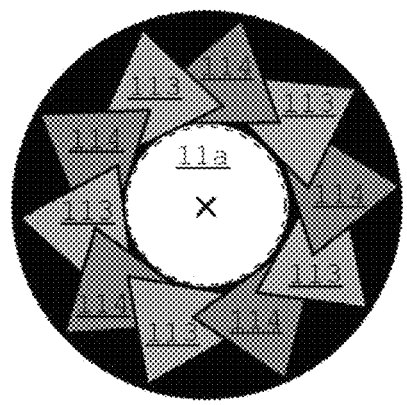
(b) Normal Narrowed-Down State
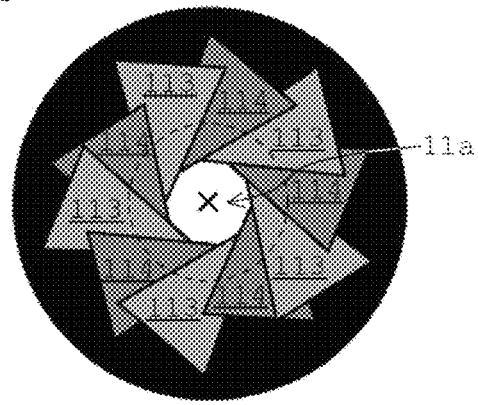
(c) Ghost-Reducing State
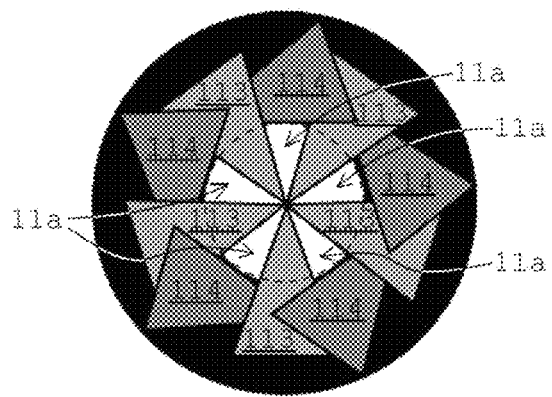
(d) Ghost-Reducing & Narrowed-Down State
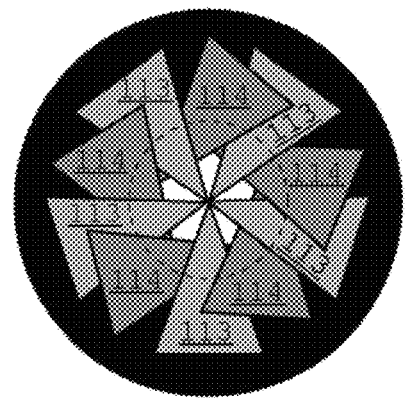

Fig. 8
(a) Open State
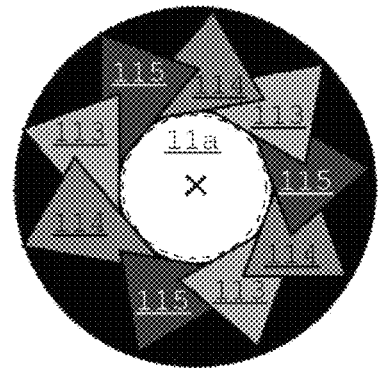
(b) Normal Narrowed-Down State
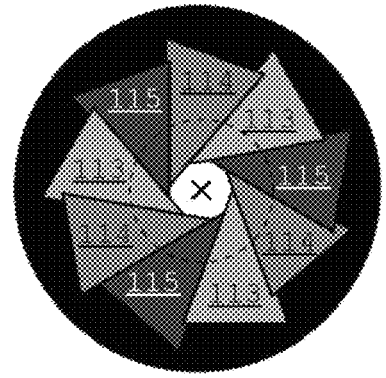
(c) Ghost-Reducing State
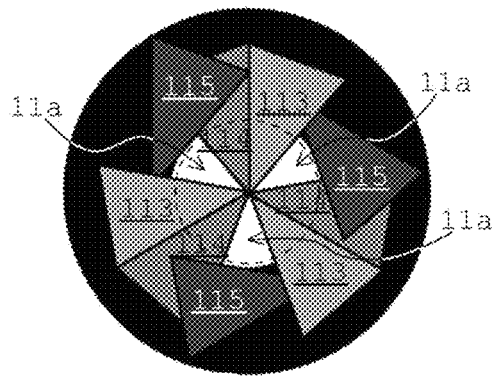
(d) Ghost-Reducing & Narrowed-Down State
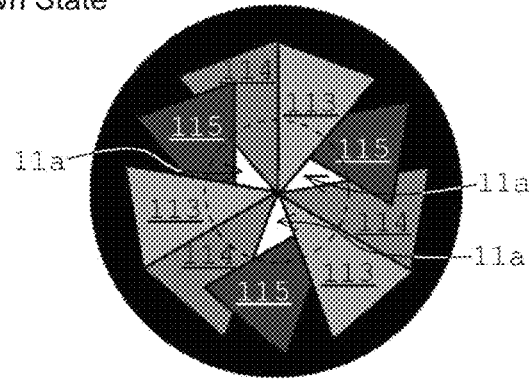

Fig. 9
(a) Open State
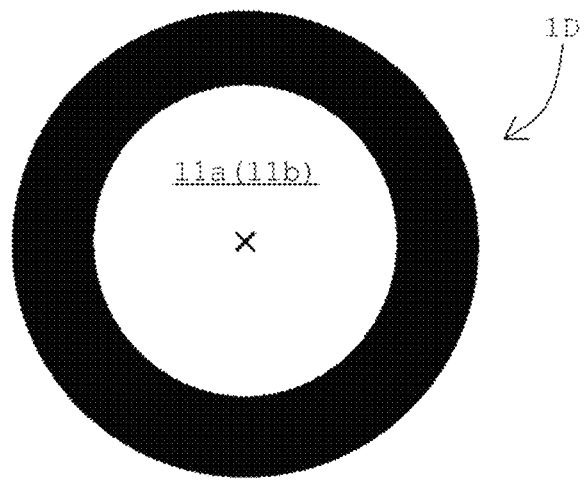
(b) Normal Narrowed-Down State
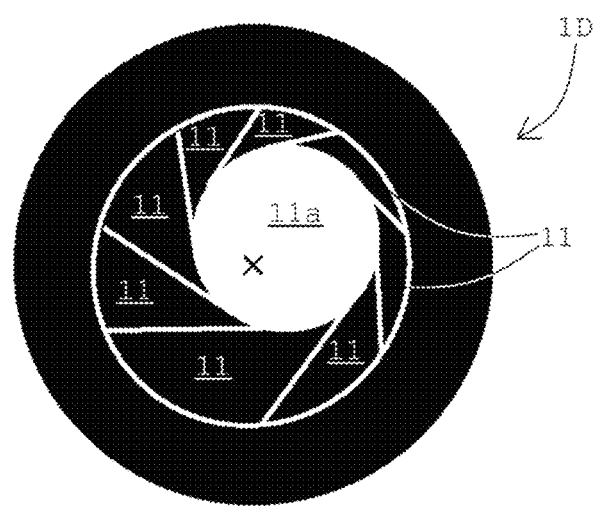
(c) Ghost-Reducing State
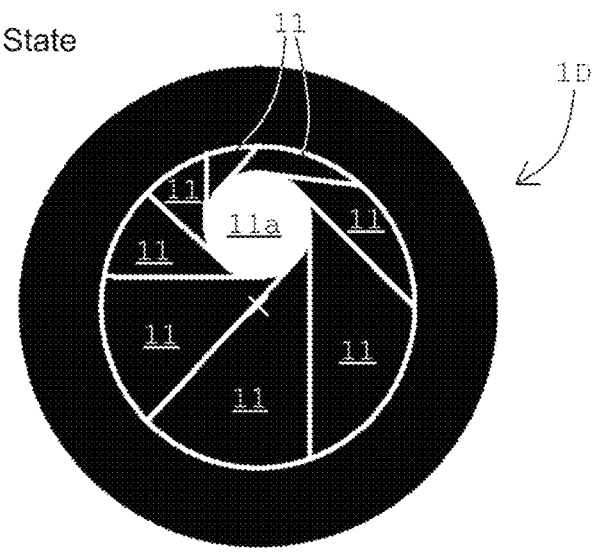

GHOST REDUCING DEVICE WITH MULTIPLE DIAPHRAGM BLADES FOR BLOCKING LIGHT FOR REDUCING GHOST, IMAGING DEVICE PROVIDED THEREWITH, GHOST REDUCING METHOD, AND IMAGING OPTICAL SYSTEM

TECHNICAL FIELD

This invention relates to a ghost reducing device and an imaging device provided with it, a ghost reducing method, and an imaging optical system that can reduce ghosts caused by a high-luminance subject such as the sun.

BACKGROUND ART

It is conventionally known that if light from a high-luminance subject such as the sun enters an imaging optical system, it is reflected by the surface of a lens, the inner surface of a barrel, etc. and becomes stray light. Because such stray light becomes a cause to form unintended images (ghosts) in an imaging screen, technologies for preventing stray light have been proposed in order to reduce the ghosts.

For example, disclosed in Japanese Unexamined Patent Application No. H10-62669 is a technology to reduce ghosts by varying the operating size of an aperture corresponding to an effective luminous flux that varies based on an aperture value (Patent Document 1). Also, proposed in Japanese Unexamined Patent Application No. H8-334725 is a technology to remove harmful light by restricting a diaphragm to a smaller aperture value than its open value. Furthermore, proposed is a method to suppress ghosts by reducing reflectance by coating the lens surface (Patent Document 2).

PRIOR ART DOCUMENTS

Patent Documents

[Patent Doc. 1] JP Laid-Open Patent Publication H10-62669
[Patent Doc. 2] JP Laid-Open Patent Publication H8-334725

SUMMARY OF THE INVENTION

Subject(s) to be Solved by Invention

However, in the conventional ghost reducing technologies mentioned above, there is a problem that there are cases where stray light still cannot be removed and ghosts occur.

On the other hand, in Japanese Patent Application No. 2015-228966, the inventors of this application proposed an invention to reduce ghosts by disposing a special douser in the vicinity of the pupil position in an imaging optical system. However, the majority of the original pupil area of the imaging optical system is blocked by the douser. Therefore, although there is no problem in a situation where a sufficient amount of light can be obtained such as outdoors under a clear sky, when photographing high-quality images during the night or on a cloudy day, it is possible that a sufficient amount of light cannot be secured.

This invention has been made in order to solve such a problem as this, and its objective is to offer a ghost reducing device and an imaging device provided with it, a ghost reducing method, and an imaging optical system that can effectively reduce ghosts in a situation where ghosts can easily occur, and suppress deterioration in image quality in a situation where ghosts can hardly occur.

Means to Solve the Subject(s)

A ghost reducing device of the invention includes multiple diaphragm blades that are formed in the vicinity of the pupil position in an imaging optical system and form at least one opening that lets light pass through, a diaphragm blade drive means that drives the diaphragm blades to adjust the size and/or position of the opening, and a control means that controls the driving of the diaphragm blades by the diaphragm blade drive means, wherein the control means controls the driving so that the diaphragm blades totally block the light in the symmetrical position to the opening with respect to the optical axis of the imaging optical system.

As another embodiment of the invention, the multiple diaphragm blades may comprise a first diaphragm blade and a second diaphragm blade overlapping each other, form the opening with opening windows or cut-outs installed on both of them, and be disposed so that a center of the opening coincides with the optical axis when the opening is maximally opened, the diaphragm blade drive means may comprise a first drive part that drives the first diaphragm blade and a second drive part that drives the second diaphragm blade, and when reducing ghosts, the control means may control the first drive part and the second drive part independently, and controls the driving so that one of the first diaphragm blade and the second diaphragm blade blocks light on the optical axis.

As another embodiment of the invention, the multiple diaphragm blades may be configured in an iris diaphragm structure provided with multiple diaphragm blade groups comprising multiple diaphragm blades, and be disposed so that a center of its opening circle of the iris diaphragm coincides with the optical axis, the diaphragm blade drive means may be provided with diaphragm blade group drive parts, each of which drives all the diaphragm blades belonging to the diaphragm blade group, and when reducing ghosts, the control means may control the diaphragm blade group drive parts independently, and control the driving so that at least one group of the diaphragm blade groups blocks the light on the optical axis.

As another embodiment of the invention, the multiple diaphragm blades may be configured in an iris diaphragm structure, and be disposed so that a center of its opening circle coincides with the optical axis when the iris diaphragm is maximally opened, the diaphragm blade drive means may comprise a diaphragm blade drive part that individually gives different drive amounts to the diaphragm blades, and when reducing ghosts, the control means may control the driving so that the opening is formed into a circle of which a center is offset from the optical axis when the iris diaphragm is narrowed down, and one piece of the diaphragm blades blocks the light on the optical axis.

As another embodiment of the invention, the multiple diaphragm blades may be configured in an iris diaphragm structure, and be disposed so that a center of the opening circle of the iris diaphragm coincides with the optical axis in a prescribed reference position, the diaphragm blade drive means may comprise an iris diaphragm drive part that drives the diaphragm blades as an iris diaphragm, and a slide drive part that slides all the diaphragm blades from the reference position, and when reducing ghosts, the control means may control the iris diaphragm drive part to narrow down the opening, and controls the driving of the slide drive part so that one of the diaphragm blades blocks the light on the optical axis.

Also, an imaging device provided with the ghost reducing device discussed above.

Further, a ghost reducing method of the invention, wherein multiple diaphragm blades that are to be driven so as to form at least one opening to let light pass through are disposed in the vicinity of the pupil position in an imaging optical system, and the diaphragm blades are driven so as to block totally the symmetrical position to the opening with respect to the optical axis of the imaging optical system.

Also, an imaging optical system of the invention forms an image of light from a subject through a lens onto an imaging element, wherein multiple diaphragm blades that can be driven so as to form at least one opening to let the light pass through are disposed in the vicinity of the pupil position in the imaging optical system, and are driven so as to block the light totally in the symmetrical position to the opening with respect to the optical axis of the imaging optical system.

Advantage of the Invention

According to this invention, ghosts can be effectively reduced in a situation where ghosts can easily occur, and deterioration in image quality can be suppressed in a situation where ghosts can hardly occur.

BRIEF DESCRIPTIONS OF THE DRAWINGS

FIG. 6 is diagrams showing (a) the open state, (b) the normal narrowed-down state, (c) the ghost-reducing state, and (d) the ghost-reducing and narrowed-down state in Example 2.

FIG. 8 is diagrams showing (a) the open state, (b) the normal narrowed-down state, (c) the ghost-reducing state, and (d) the ghost-reducing and narrowed-down state in Example 3.

FIG. 9 is diagrams showing (a) the open state, (b) the normal narrowed-down state, and (c) the ghost-reducing state in Example 4.

DETAILED DESCRIPTIONS OF PREFERRED EMBODIMENT(S)

First, after their earnest research and trials and errors, the inventors of this application found out that reflection on an imaging surface of a photographing film, an image sensor, etc. was greater than reflection on a lens surface for light from a high-luminance subject such as the sun. Then, they found out that as shown in FIG. 12, unnecessary light reflected by the imaging surface was reflected by the lens and became return light, which was a major cause to generate a ghost.

Figure 12:
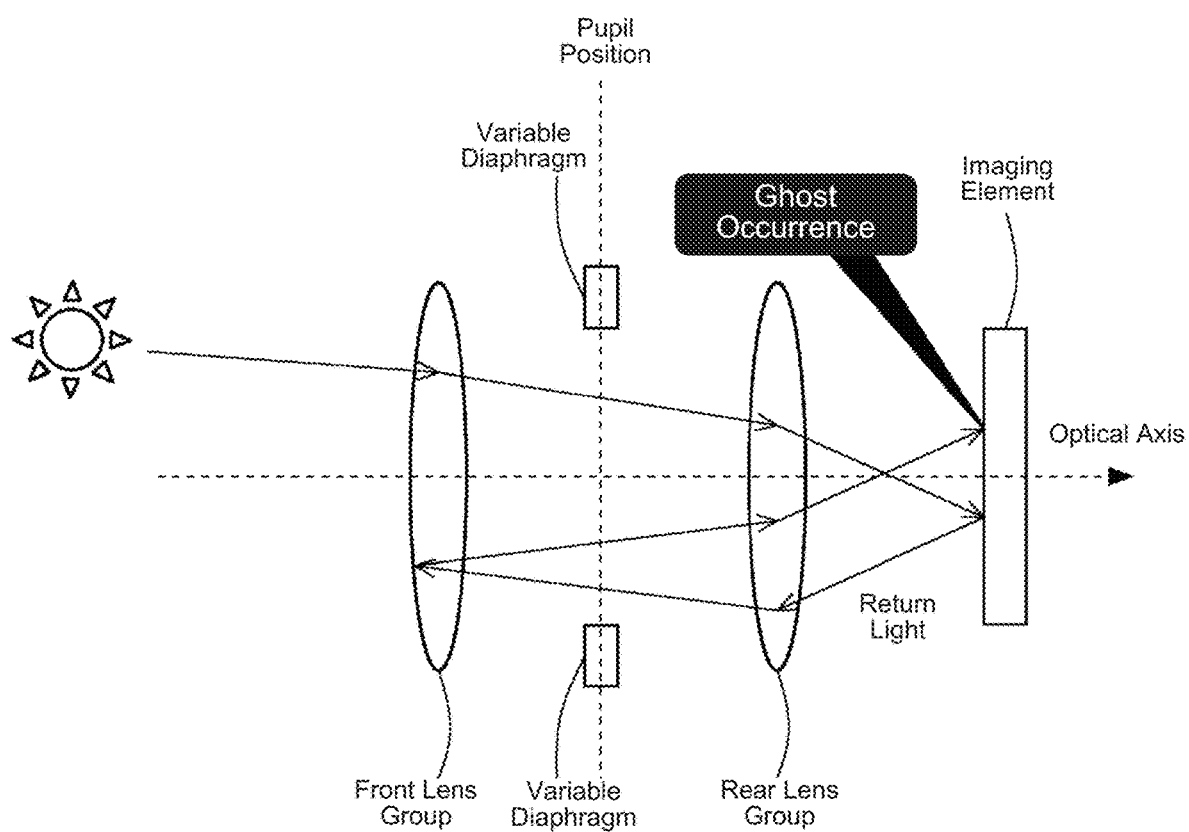
FIG. 12 is a diagram showing a cause of ghost occurrences in a conventional imaging optical system.

On the other hand, in many imaging optical systems, as shown in FIG. 12, in both cases of high light intensity and low light intensity, a variable diaphragm such as a rhombic diaphragm and an iris diaphragm that can adjust the amount of light passing through is installed in the pupil position as a means to guide an appropriate amount of light to an imaging element. However, because the opening of the variable diaphragm always maintains an approximately symmetrical shape centering on the optical axis, it has a structure that cannot remove the above-mentioned unnecessary light.

Then, the inventors of this application conceived an idea to reduce ghosts effectively while minimizing hardware for reducing ghosts by controlling a variable diaphragm so that the above-mentioned unnecessary light reflected by the imaging surface would not return to the imaging surface, and eventually completed this invention. Explained below referring to drawings is an embodiment of the ghost reducing device and the imaging device provided with it, the ghost reducing method, and the imaging optical system of this invention.

Figure 1:
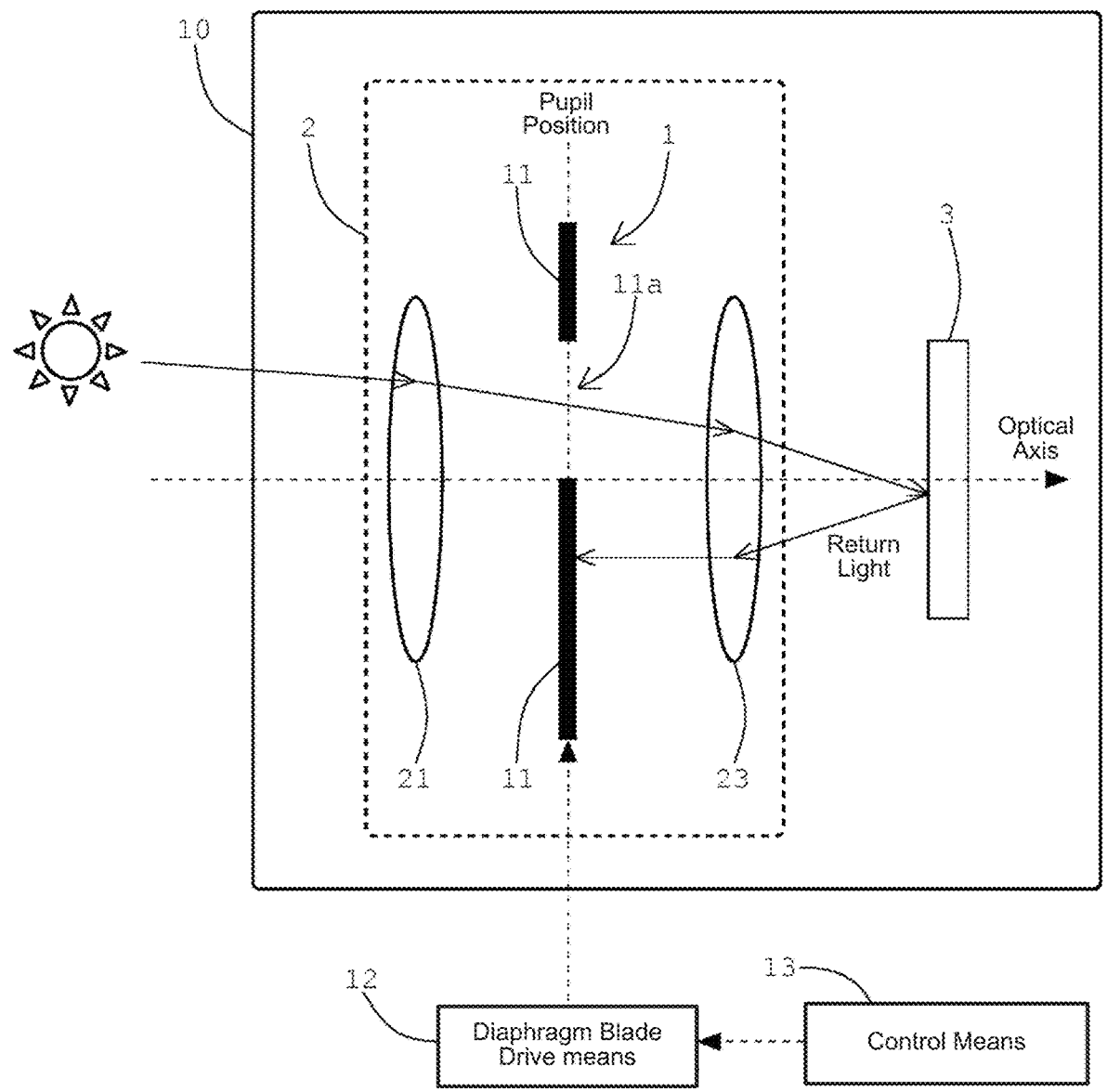
FIG. 1 is a diagram showing an embodiment of the ghost reducing device, the imaging device, and the imaging optical system of this invention.

FIG. 1 is a diagram showing an imaging device 10 provided with an imaging optical system 2 containing a ghost reducing device 1 of this embodiment. As shown in FIG. 1, the imaging device 10 of this embodiment is configured mainly of the imaging optical system 2 for imaging a subject, and an imaging element 3 disposed in the focal position in this imaging optical system 2. Then, by disposing diaphragm blades 11 constituting the ghost reducing device 1 in the vicinity of the pupil position in the imaging optical system 2, return light reflected by the surface of the imaging element 3 is blocked to reduce ghosts. Explained below are their configurations.

The imaging optical system 2 forms an image of light from the subject onto the imaging element 3 through a lens. In this embodiment, as shown in FIG. 1, the imaging optical system 2 has a front lens group 21 disposed in the front of the pupil position, the diaphragm blades 11 disposed in the pupil position, and a rear lens group 23 disposed in the rear of the pupil position.

The front lens group 21 and the rear lens group 23 are each configured of at least one lens for forming an image of light from the subject onto the imaging element 3. Note that although in this embodiment the imaging optical system 2 has the front lens group 21 and the rear lens group 23, this invention is not limited to this configuration but can effectively apply to the imaging optical system 2 having at least the front lens group 21.

The ghost reducing device 1 is for blocking return light from the imaging element 3 and thus reducing ghosts. In this embodiment, the ghost reducing device 1 has multiple diaphragm blades 11 disposed in the vicinity of the pupil position in the imaging optical system 2, a diaphragm blade drive means 12 that drives the diaphragm blades 11, and a control means 13 that controls the driving of the diaphragm blades 11 by this diaphragm blade drive means 12.

The diaphragm blades 11 are disposed in the pupil position in the imaging optical system 2 for adjusting the amount of light passing through. In this embodiment, the diaphragm blades 11 are configured as multiple pieces formed of a black material having a low reflectance, and form at least one opening 11a that lets light pass through as shown in FIG. 1. Also, as mentioned below in Examples 1-5, the diaphragm blades 11 are configured capable of adjusting the size and/or position of the opening 11a as appropriate and totally blocking the symmetrical position of the opening 11a with respect to the optical axis of the imaging optical system 2 by being driven by the diaphragm blade drive means 12.

Note that although in this embodiment the diaphragm blades 11 are installed in the pupil position, this invention is not limited to this configuration, but they only need to be in the vicinity of the pupil position. That is, because the so-called "pupil position" is an optical and theoretical position, the position can be somewhat deviated from it in the actual mounting. Also, in the case of the imaging optical system 2 and the imaging device 10 where the pupil position is within a lens, the diaphragm blades 11 can be installed in the front or the rear of the lens. That is, in this invention, the vicinity of the pupil position is a concept that includes not only the pupil position but also positions such as the front and the rear of the pupil position close to the pupil position within a range where the ghost reducing effect of this invention can be performed without generating vignetting.

The diaphragm blade drive means 12 drives the diaphragm blades 11 to adjust the size and/or position of the opening 11a. In this embodiment, as mentioned below in Examples 1-5, the diaphragm blade drive means 12 is configured of a mechanism to move the diaphragm blades 11 individually and independently along a direction perpendicular to the optical axis, or a mechanism to move part or all of the diaphragm blades 11 interlocked or integrally. Note that the diaphragm blade drive means 12 is configured of, for example, an electronic control mechanism or a cam mechanism such as a solenoid actuator or a stepping motor.

The control means 13 is configured of a CPU (Central Processing Unit) etc. and controls the driving of the diaphragm blades 11 by the diaphragm blade drive means 12. In this embodiment, when reducing ghosts, the control means 13 performs such a drive control that the diaphragm blades 11 block light totally in the symmetrical position to the opening 11a with respect to the optical axis of the imaging optical system 2. On the other hand, when there is no need to reduce ghosts, it controls the driving of the diaphragm blades 11 in the same diaphragm operation as in the conventional case.

Note that instruction signals to the control means 13 can be output based on a manual operation or automatically output based on the detection result of a light detection means that detects the intensity of light entering the imaging optical system 2. That is, the drive amounts of the diaphragm blades 11 corresponding to the open time, the normal narrowed-down time, the ghost-reducing time, the ghost-reducing and narrowed-down time, etc. of the diaphragm blades 11 can be set in advance, and the control can be performed in such a way that when strong light has been detected, the diaphragm blades 11 are automatically narrowed down, and when weak light has been detected, the diaphragm blades 11 are automatically opened.

Note that although the imaging element 3 can be utilized as the light detection means, this invention is not limited to this configuration, but any light sensor such as one having cadmium sulfide (CdS) cells built-in can be separately installed as the light detection means as long as it can detect the intensity of light entering the imaging optical system 2.

The imaging element 3 is configured of a CCD (Charge-Coupled Device) image sensor or the like, photoelectrically converts brightness degrees of parts of an image formed on a light-receiving surface into the amounts of charge, and sequentially reads and converts them into electric signals. Note that the scope of application of this invention is not limited to the imaging optical system 2 having the imaging element 3, but it is also applicable to an imaging optical system having no imaging element 3, such as a film camera.

Next, explained are the actions of the ghost reducing device 1 and the imaging device 10 provided with it, the ghost reducing method, and the imaging optical system 2 of this embodiment provided with the above configuration.

First, in a situation where ghosts can easily occur such as when a high-luminance subject such as the sun exists in the field of view, as shown in FIG. 1, the control means 13 controls the driving of the diaphragm blades 11 so as to block light totally in the symmetrical position to the opening 11a with respect to the optical axis of the imaging optical system 2. Thereby, the diaphragm blades 11 in the vicinity of the pupil position restrict an incident luminous flux to only light passing through at least one opening 11a.

Light that passed through at least one opening 11a forms an image on the surface of the imaging element 3 through the rear lens group 23, and most of it is absorbed into the imaging element 3. However, as shown in FIG. 1, part of the light is specularly reflected by the surface of the imaging element 3 and becomes return light. When this return light comes back to the vicinity of the pupil position again, as shown in FIG. 1, it reaches the symmetrical position to the position where it entered with respect to the optical axis.

That is, in this invention, because return light is derived from light that passed through the opening 11a formed with the diaphragm blades 11, in the vicinity of the pupil position, it comes back to a part blocked totally by the diaphragm blades 11. Thereby, the diaphragm blades 11 block all the return light in the vicinity of the pupil position and never return it toward the front. Therefore, the ghost reducing device 1 of this invention effectively suppresses such a phenomenon as shown in FIG. 12 that return light reaches the front lens group and is reflected again by the front lens group, generating a ghost on the surface of the imaging element.

Note that if the rear lens group 23 has many lenses, the probability that return light is reflected before reaching the douser 11 and returns to the imaging element 3 becomes high, and the number of removed ghosts becomes relatively small. However, if the front lens group 21 has many lenses, many ghosts (return light beams) that are targets of removal occur, and the effect of the ghost reducing device 1 that can block them becomes extremely great.

On the other hand, in a situation where ghosts can hardly occur such as photographing during the night or on a cloudy day, the control means 13 opens the diaphragm blades 11 so that the size of the opening 11a becomes the maximum. Thereby, the diaphragm blades 11 secure the maximum incident luminous flux passing through the opening 11a. Therefore, even during the night or on a cloudy day, because a sufficient amount of light is guided onto the imaging element 3, deterioration in image quality of the photographed images is suppressed.

According to this invention mentioned above, the following effects are achieved.

1. In a situation where ghosts can easily occur such as outdoor photographing under a clear sky, ghosts can be effectively reduced by blocking unnecessary light that becomes a cause of ghosts
2. In a situation where ghosts can hardly occur such as during the night or on a cloudy day, deterioration in image quality can be effectively suppressed by securing a sufficient amount of light.
3. Because ghosts are effectively reduced according to the necessity, in surveillance cameras, automobile-mounted cameras, etc. that are demanded to photograph a certain region constantly, high-quality and easy-to-see images can be offered regardless of time of the day or the weather.
4. Especially in the imaging optical system 2 or the imaging device 10 where the front lens group 21 has many lenses, a great ghost reduction effect can be obtained.
5. If an image recognition technology is applied to images taken by the imaging device 10 as in a machine vision system, ghosts that become noise can be reduced, therefore the recognition accuracy can be improved.
6. Because the ghost reducing device 1 also has a ghost reducing function in addition to the normal diaphragm function, hardware for reducing ghosts can be minimized, contributing to the space saving of the imaging optical system 2 and the cost reduction of the imaging device 10.

Next, specific examples of the ghost reducing device 1 of this invention are explained. Note that in the configurations in Examples 1-5 below, their components that are identical or correspond to the components explained in this embodiment mentioned above are given the same reference numerals, and their repeated explanations are omitted.

EXAMPLE 1

Figure 2:
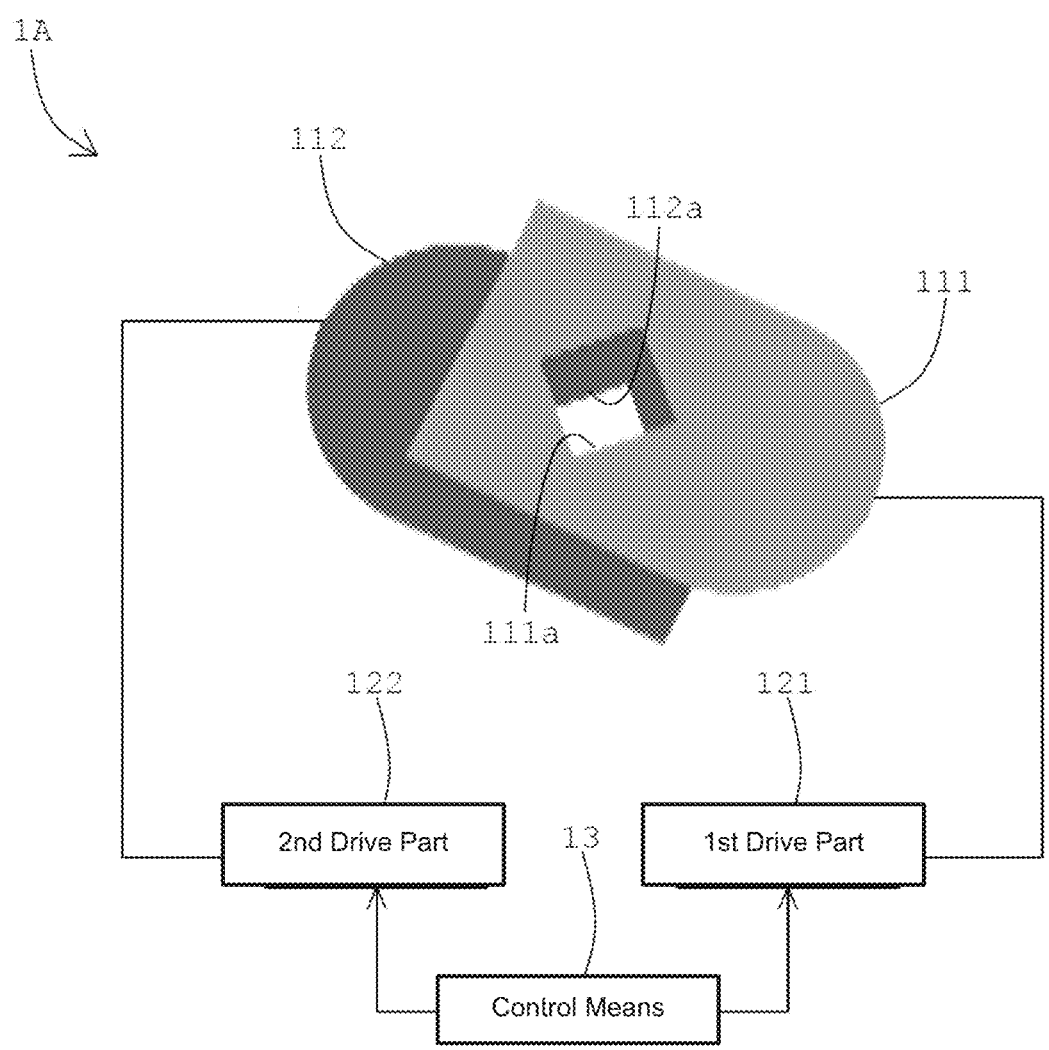
FIG. 2 is a diagram showing Example 1 of the ghost reducing device of this invention.

The characteristic of a ghost reducing device 1A in this Example 1 is, as shown in FIG. 2, that the multiple diaphragm blades 11 comprise of a first diaphragm blade 111 and a second diaphragm blade 112 overlapping each other. Specifically, rhombic opening windows 111a and 112a are installed on the first diaphragm blade 111 and the second diaphragm blade 112, respectively, and an opening 11a is formed with these opening windows 111a and 112a. Also, as show in FIG. 3 (a), they are disposed so that the center of the opening 11a in its maximally opened state coincides with the optical axis. Note that in the drawings in FIG. 3 and later, an x mark indicates the optical axis position, and a broken circle mark indicates the pupil size.

Also in this Example 1, as shown in FIG. 2, a diaphragm blade drive means 12 is configured of a first drive part 121 that drives the first diaphragm blade 111 and a second drive part 122 that drives the second diaphragm blade 112. These first drive part 121 and second drive part 122 drive the first diaphragm blade 111 and the second diaphragm blade 112, respectively, in a freely slidable manner in the right-left direction, thereby changing the degree of overlap between the opening windows 111a and 112a to adjust the size of the opening 11a.

A control means 13 controls the first drive part 121 and the second drive part 122 independently to drive the first diaphragm blade 111 and the second diaphragm blade 112 by their prescribed amounts of motion, respectively. In this Example 1, the control means 13 realizes various kinds of states mentioned below based on the presence/absence of a specification on the aperture value and a specification on the ghost reducing function of this invention.

Figure 3:
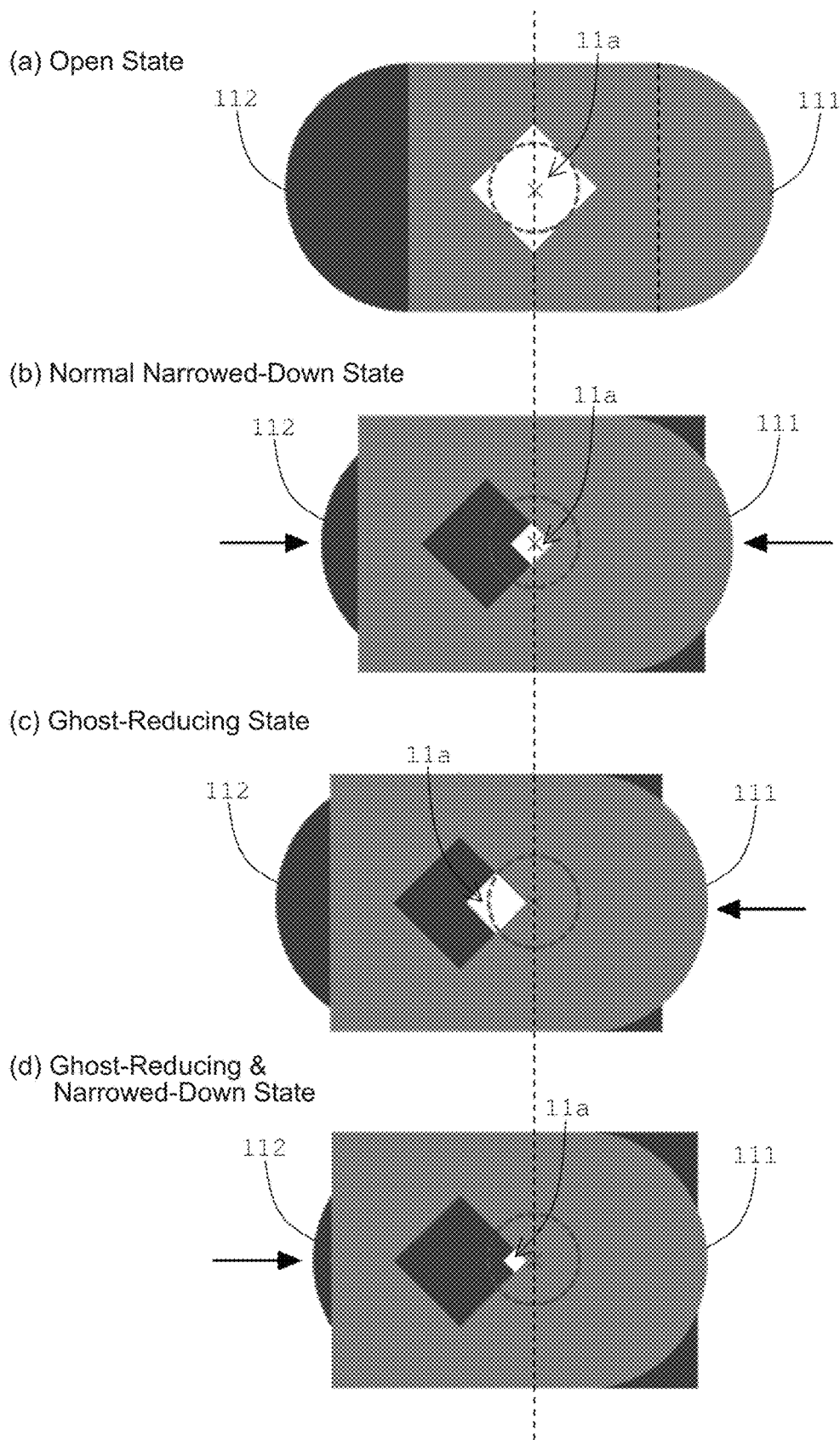
FIG. 3 is diagrams showing (a) the open state, (b) the normal narrowed-down state, (c) the ghost-reducing state, and (d) the ghost-reducing and narrowed-down state in Example 1.

Next, explained are the actions of the ghost reducing device 1A of this Example 1 provided with the above configuration. When there is no need to reduce ghosts because the amount of light is small such as during the night or on a cloudy day, as shown in FIG. 3 (a), the control means 13 aligns the opening windows 111a and 112a to set the opening 11a to an open state where it is maximally opened. Thereby, the amount of light guided onto an imaging element 3 is secured at the maximum, suppressing deterioration in image quality to the minimum even during the night or on a cloudy day.

Also, when narrowing down from the open state, as shown in FIG. 3 (b), the control means 13 lets both the first diaphragm blade 111 and the second diaphragm blade 112 move in a direction to approach each other by the same amount according to the narrowing-down amount while keeping the center of the opening 11a coinciding with the optical axis. Thereby, the overlap between the opening windows 111a and 112a becomes small, and they are set to a normal narrowed-down state where the opening 11a is narrowed down according to the aperture value.

Furthermore, when executing the ghost reducing function, the control means 13 drives only the first drive part 121 to move the first diaphragm blade 111 in the approaching direction (leftward in FIG. 3). Then, as shown in FIG. 3 (c), once the first diaphragm blade 111 blocks the optical axis, the first drive part 121 is stopped to set it to a ghost-reducing state. Thereby, because the diaphragm blades 111 and 112 totally block light in the symmetrical position to the opening 11a with respect to the optical axis, unnecessary return light from the imaging element 3 is blocked, reducing ghosts.

Also, when narrowing down further from the above-mentioned ghost-reducing state, as shown in FIG. 3 (d), the control means 13 keeps the first drive part 121 stopped and drives the second drive part 122 to move the second diaphragm blade 112 in the approaching direction (rightward in FIG. 3) according to the narrowing-down amount, setting it to a ghost-reducing and narrowed-down state. At this time, because the symmetrical position to the opening 11a still blocks light, the ghost reducing function is maintained. Also, because the center of the opening 11a approaches the optical axis, aberration due to ambient light is reduced.

According to this Example 1 above, it has been demonstrated that using the ghost reducing device 1A that can independently control the first diaphragm blade 111 and the second diaphragm blade 112 overlapping each other, ghosts can be effectively reduced in a situation where ghosts can easily occur, and deterioration in image quality can be suppressed in a situation where ghosts can hardly occur.

Note that although in this Example 1 mentioned above, light was blocked on the optical axis by driving the first diaphragm blade 111 in reducing ghosts, this invention is not limited to this configuration, but the second diaphragm blade 112 can be driven. That is, only one of the first diaphragm blade 111 and the second diaphragm blade 112 needs to be driven so as to block light on the optical axis.

Figure 4:
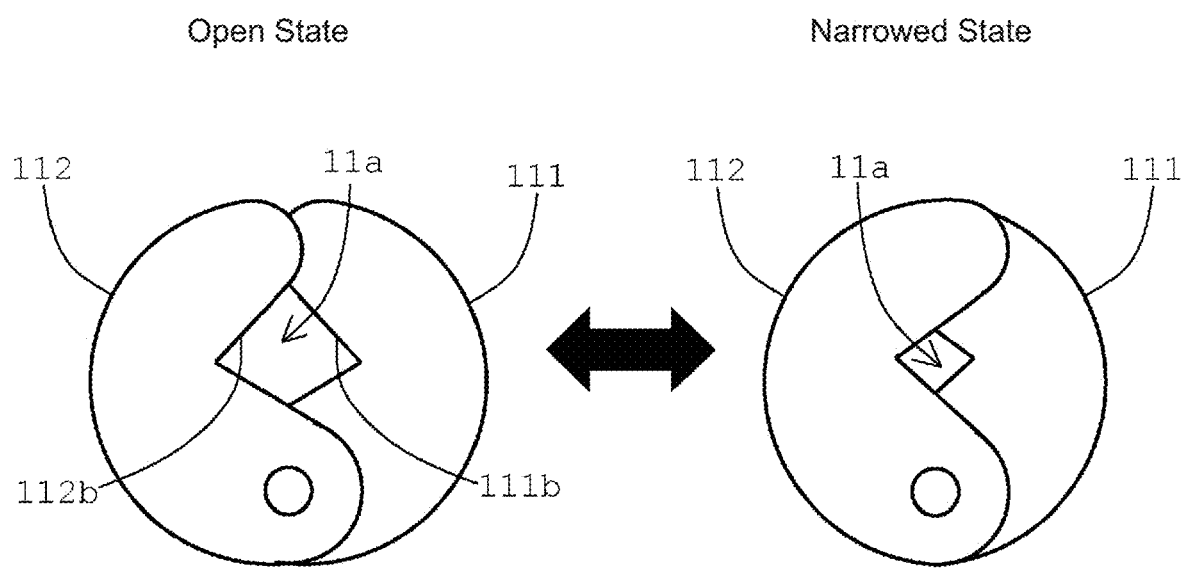
FIG. 4 is a diagram showing another example of the first diaphragm blade and the second diaphragm blade in Example 1.

Also, the shape of the opening windows 111a and 112a installed on the first diaphragm blade 111 and the second diaphragm blade 112 is not limited to a rhombus but can be another shape such as an approximate V-shape cut-out. Furthermore, although in this Example 1 mentioned above, the first diaphragm blade 111 and the second diaphragm blade 112 were let slide linearly, this invention is not limited to this configuration. For example, as shown in FIG. 4, the first diaphragm blade 111 and the second diaphragm blade 112 having approximate V-shape cut-outs 111b and 112b can be rotated around a prescribed rotation axis to open/close the opening 11a.

EXAMPLE 2

Figure 5:
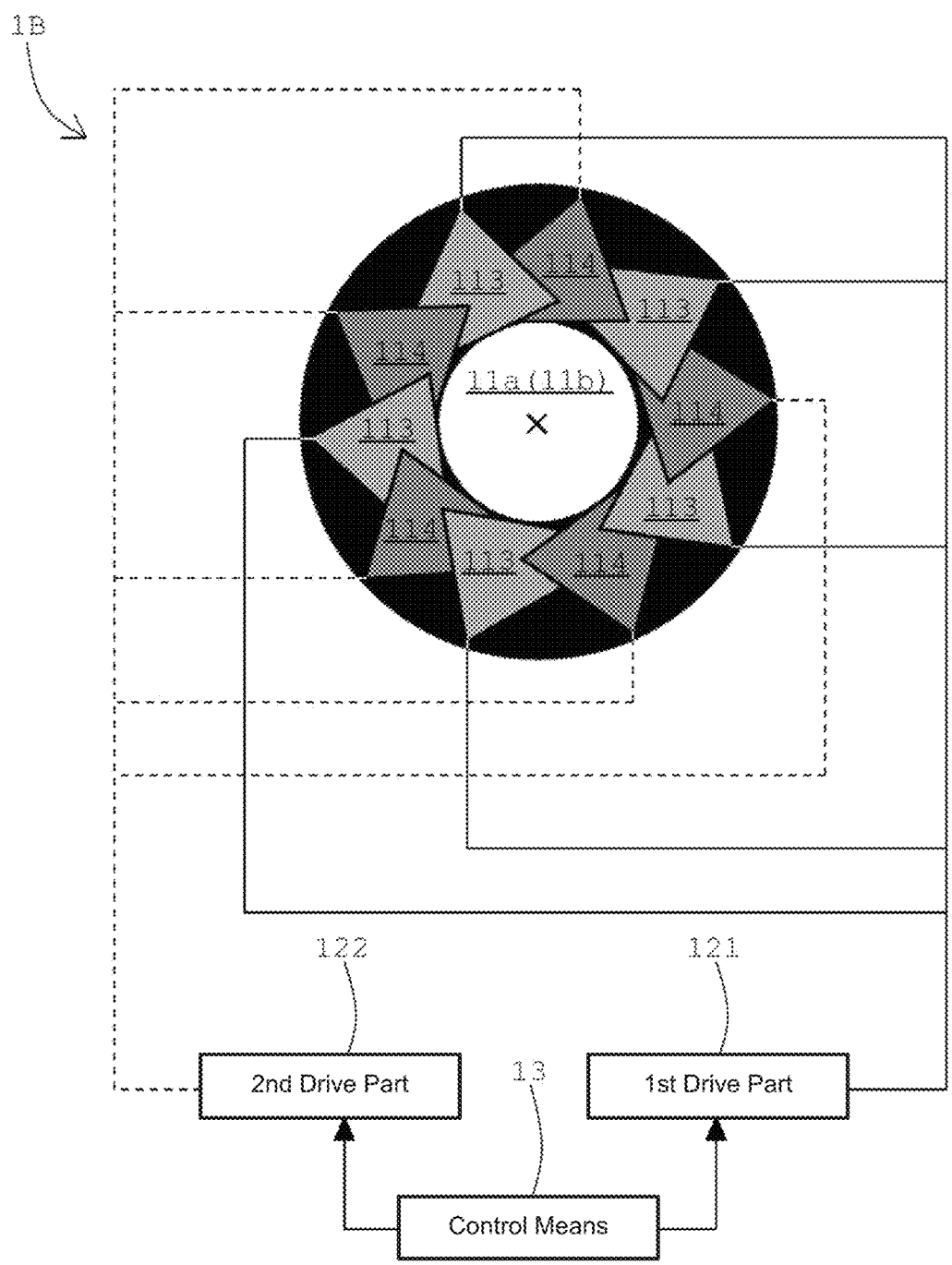
FIG. 5 is a diagram showing Example 2 of the ghost reducing device of this invention.

The characteristic of a ghost reducing device 1B in this Example 2 is, as shown in FIG. 5, having an iris diaphragm structure provided with multiple diaphragm blade groups comprising multiple diaphragm blades 11. In Example 2, the diaphragm blades 11 are configured of an even number of pieces disposed in point symmetry with respect to the optical axis, and are alternately divided into a first diaphragm blade group 113 and a second diaphragm blade group 114. Also, they are disposed so that the center of an opening circle 11b of the iris diaphragm coincides with the optical axis.

Also, in this Example 2, as shown in FIG. 5, a diaphragm blade drive means 12 is provided with a first drive part 121 that drives all the diaphragm blades belonging to the first diaphragm blade group 113, and a second drive part 122 that drives all the diaphragm blades belonging to the second diaphragm blade group 114. These first drive part 121 and second drive part 122 correspond to the diaphragm blade group drive part of this invention, and drive the first diaphragm blade group 113 and the second diaphragm blade group 114 in a freely rotatable manner in the inward-outward direction to change the degree of overlap with each other, thereby adjusting the size of an opening 11a.

A control means 13 controls the first drive part 121 and the second drive part 122 independently from each other to drive the first diaphragm blade group 113 and the second diaphragm blade group 114 respectively by their prescribed amounts of motion. In this Example 2, the control means 13 realizes various kinds of states mentioned below based on the presence/absence of a specification on the aperture value and a specification on the ghost reducing function of this invention.

Next, explained are the actions of the ghost reducing device 1B of this Example 2 provided with the above configuration. When there is no need to reduce ghosts because the amount of light is small such as during the night or on a cloudy day, as shown in FIG. 6 (a), the control means 13 lets both the first diaphragm blade group 113 and the second diaphragm blade group 114 retreat to the outside of the opening circle 11b to set the opening 11a to an open state where it is maximally opened. Thereby, because the amount of light guided onto an imaging element 3 is secured at the maximum, deterioration in image quality is suppressed to the minimum even during the night or on a cloudy day.

Also, when narrowing down from the open state, as shown in FIG. 6 (b), the control means 13 lets both the first diaphragm blade group 113 and the second diaphragm blade group 114 move in the inward direction (optical axis direction) by the same amount according to the narrowing-down amount. Thereby, one opening 11a formed with the diaphragm blades 11 is set to a normal narrowed-down state where it is narrowed down according to the aperture value.

Furthermore, when executing the ghost reducing function, the control means 13 drives only the first drive part 121 to move the first diaphragm blade group 113 in the inward direction (optical-axis direction). Then, as shown in FIG. 6 (c), once the tips of the first diaphragm blade group 113 block light on the optical axis, the first drive part 121 is stopped to set it to a ghost-reducing state. Thereby, because the diaphragm blades 11 of the first diaphragm blade group 113 totally block light in the symmetrical positions of the openings 11a with respect to the optical axis, unnecessary return light from the imaging element 3 is blocked, reducing ghosts.

Also, when further narrowing down from the above-mentioned ghost-reducing state, as shown in FIG. 6 (d), the control means 13 keeps the first drive part 121 stopped and drives the second drive part 122 to move the second diaphragm blade group 114 in the inward direction (optical-axis direction) according to the narrowing-down amount, thereby setting it to a ghost-reducing and narrowed-down state. At this time, because light is still totally blocked in the symmetrical positions of the openings 11a, the ghost reducing function is maintained.

According to this Example 2 above, it has been demonstrated that by the ghost reducing device 1B that can independently control the first diaphragm blade group 113 and the second diaphragm blade group 114 forming an iris diaphragm structure, ghosts can be effectively reduced in a situation where ghosts can easily occur, and deterioration in image quality can be suppressed in a situation where ghosts can hardly occur.

Note that although in this Example 2 mentioned above, light on the optical axis was blocked by driving the first diaphragm blade group 113 when reducing ghosts, this invention is not limited to this configuration, but the second diaphragm blade group 114 can be driven. That is, the drive control only needs to be performed so that one of the first diaphragm blade group 113 and the second diaphragm blade group 114 blocks light on the optical axis.

Also, although in this Example 2 mentioned above, the diaphragm blades 11 were alternately divided into the first diaphragm blade group 113 and the second diaphragm blade group 114, this invention is not limited to this configuration. For example, the diaphragm blades 11 in one side of a line perpendicular to the optical axis can be assigned to the first diaphragm blade group 113, and the diaphragm blades 11 in the other side can be assigned to the second diaphragm blade group 114. In this case, by opening either one of the diaphragm blade groups, the opening 11a in a semicircular shape is formed.

Furthermore, although in this Example 2 mentioned above, an even number of diaphragm blades 11 were divided to the first diaphragm blade group 113 and the second diaphragm blade group 114 by the same number of pieces, this invention is not limited to this configuration. That is, as exemplified in Example 3 below, an odd number of diaphragm blades 11 can be driven, divided into three or more diaphragm blade groups.

EXAMPLE 3

Figure 7:
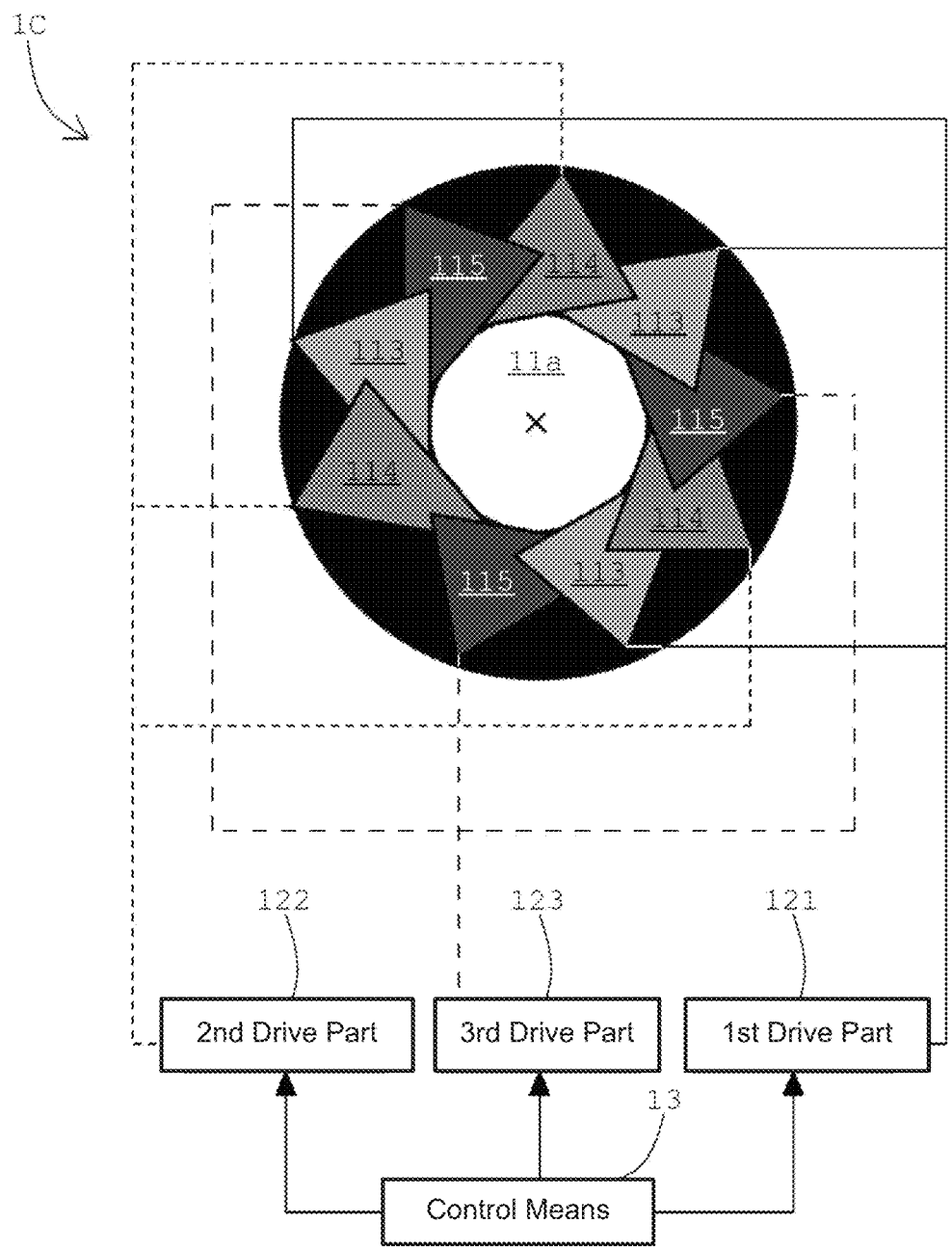
FIG. 7 is a diagram showing Example 3 of the ghost reducing device of this invention.

A ghost reducing device 1C in this Example 3 corresponds to a modification of Example 2 that adopted an iris diaphragm structure. In this Example 3, as shown in FIG. 7, diaphragm blades 11 are configured of an odd number of pieces (nine pieces) disposed in point symmetry with respect to the optical axis, and divided alternately into a first diaphragm blade group 113, a second diaphragm blade group 114, and a third diaphragm blade group 115. Also, they are disposed so that the center of an opening circle 11b of an iris diaphragm coincides with the optical axis.

In this Example 3, as shown in FIG. 7, a diaphragm blade drive means 12 is provided with a first drive part 121 that drives all the diaphragm blades 11 belonging to the first diaphragm blade group 113, a second drive part 122 that drives all the diaphragm blades 11 belonging to the second diaphragm blade group 114, and a third drive part 123 that drives all the diaphragm blades 11 belonging to the third diaphragm blade group 115. These first drive part 121, second drive part 122, and third drive part 123 correspond to the diaphragm blade group drive part of this invention, and each of the first diaphragm blade group 113, the second diaphragm blade group 114, and the third diaphragm blade group 115 is driven in a freely rotatable manner in the inward-outward direction to change the degree of their mutual overlap, thereby adjusting the size of an opening 11a.

The control means 13 controls the first drive part 121, the second drive part 122, and the third drive part 123 independently to drive the first diaphragm blade group 113, the second diaphragm blade group 114, and the third diaphragm blade group 115, respectively by their prescribed amounts of motion. In this Example 3, the control means 13 realizes various kinds of states mentioned below based on the presence/absence of a specification on the aperture value and a specification on the ghost reducing function of this invention.

Next, explained are the actions of the ghost reducing device 1C of this Example 3 provided with the above configuration. When there is no need to reduce ghosts because the amount of light is small such as during the night or on a cloudy day, as shown in FIG. 8 (a), the control means 13 lets all the diaphragm blade groups 113, 114, and 115 retreat to the outside of an opening circle 11b to set the opening 11a to an open state where it is maximally opened. Thereby, because the amount of light guided onto an imaging element 3 is secured at the maximum, deterioration in image quality is suppressed to the minimum even during the night or on a cloudy day.

Also, when narrowing down from the open state, as shown in FIG. 8 (b), the control means 13 lets ally the first diaphragm blade group 113, the second diaphragm blade group 114, and the third diaphragm blade group 115 move in the inward direction (optical axis direction) by the same amount according to the narrowing-down amount. Thereby, the opening 11a formed with the diaphragm blades 11 is set to a normal narrowed-down state where it is narrowed down according to the aperture value.

Furthermore, when executing the ghost reducing function, the control means 13 drives only the first drive part 121 and the second drive part 122 to move the first diaphragm blade group 113 and the second diaphragm blade group 114 in the inward direction (optical-axis direction). Then, as shown in FIG. 8 (c), once the tips of the first diaphragm blade group 113 and the second diaphragm blade group 114 block light on the optical axis, the first drive part 121 and the second drive part 122 are stopped to set them to a ghost-reducing state. Thereby, because the diaphragm blades 11 of the first diaphragm blade group 113 and the second diaphragm blade group 114 form multiple openings 11a and totally block light in the symmetrical positions of the openings 11a with respect to the optical axis, unnecessary return light from the imaging element 3 is blocked, reducing ghosts.

Also, when further narrowing down from the abovementioned ghost-reducing state, as shown in FIG. 8 (d), the control means 13 keeps the first drive part 121 and the second drive part 122 stopped and drives the third drive part 123 to move the third diaphragm blade group 115 in the inward direction (optical-axis direction) according to the narrowing-down amount, thereby setting it to a ghostreducing and narrowed-down state. At this time, because light is still totally blocked in the symmetrical positions of the openings 11a, the ghost reducing function is maintained.

According to this Example 3 above, it has been demonstrated that by the ghost reducing device 1C that can independently control the first diaphragm blade group 113, the second diaphragm blade group 114, and the third diaphragm blade group 115 forming an iris diaphragm structure, ghosts can be effectively reduced in a situation where ghosts can easily occur, and deterioration in image quality can be suppressed in a situation where ghosts can hardly occur.

Note that although in this Example 3 mentioned above, light on the optical axis was blocked by driving the first diaphragm blade group 113 and the second diaphragm blade group 114 when reducing ghosts, this invention is not limited to this configuration. That is, the drive control only needs to be performed so that at least one of the first diaphragm blade group 113, the second diaphragm blade group 114, and the third diaphragm blade group 115 blocks light on the optical axis.

EXAMPLE 4

The characteristic of a ghost reducing device 1D in this Example 4 is, as shown in FIG. 9, having a special iris diaphragm structure where multiple diaphragm blades 11 are disposed anisotropically with respect to the optical axis. In this Example 4, the diaphragm blades 11 have different extending amounts set and are configured in a freely rotatable manner in the inward-outward direction. Also, they are disposed so that the center of an opening circle 11b of the iris diaphragm when it is maximally opened coincides with the optical axis.

Also, in this Example 4, the driving by a diaphragm blade drive means 12 is controlled by a control means 13 to give each different drive amounts to the individual diaphragm blades 11, thereby adjusting the size and position of an opening 11a.

The control means 13 lets the individual diaphragm blades 11 extend or retreat by different drive amounts using the diaphragm blade drive means 12. In this Example 4, the control means 13 realizes various kinds of states mentioned below based on the presence/absence of a specification on the aperture value and a specification on the ghost reducing function of this invention.

Next, explained are the actions of the ghost reducing device 1D of this Example 4 provided with the above configuration. When there is no need to reduce ghosts because the amount of light is small such as during the night or on a cloudy day, as shown in FIG. 9 (a), the control means 13 lets all the diaphragm blades 11 retreat to the outermost side to set the opening 11a to an open state where it is maximally opened. Thereby, because the amount of light guided onto an imaging element 3 is secured at the maximum, deterioration in image quality is suppressed to the minimum even during the night or on a cloudy day.

Also, when narrowing down from the open state, as shown in FIG. 9 (b), the control means 13 lets the diaphragm blades 11 move in the inward direction (optical-axis direction) by each different narrowing-down amounts. Thereby, the opening 11a formed with the diaphragm blades 11 is set to a normal narrowed-down state where it is narrowed down according to the aperture value.

Furthermore, when executing the ghost reducing function, the control means 13 drives the diaphragm blades 11 further in the inward direction (optical-axis direction). Then, as shown in FIG. 9 (c), the drive control is performed so that the center of the opening 11a comes to a position off the optical axis when the iris diaphragm is narrowed down, and one piece of the diaphragm blades 11 blocks light on the optical axis, setting it to a ghost-reducing state. Thereby, because one of the diaphragm blades 11 totally blocks light in the symmetrical position of the opening 11a with respect to the optical axis, unnecessary return light from the imaging element 3 is blocked, reducing ghosts.

Note that when further narrowing down from the above-mentioned ghost-reducing state, the control means 13 further drives the diaphragm blade drive means 12 to move the diaphragm blades 11 in the inward direction (optical-axis direction) according to the narrowing-down amounts, thereby setting it to a further narrowed-down state. At this time, because light is still totally blocked in the symmetrical position to the opening 11a, the ghost reducing function is maintained.

According to this Example 4 above, it has been demonstrated that by the ghost reducing device 1D that can perform such a control that the center of the opening 11a deviates from the optical axis, ghosts can be effectively reduced in a situation where ghosts can easily occur.

EXAMPLE 5

Figure 10:
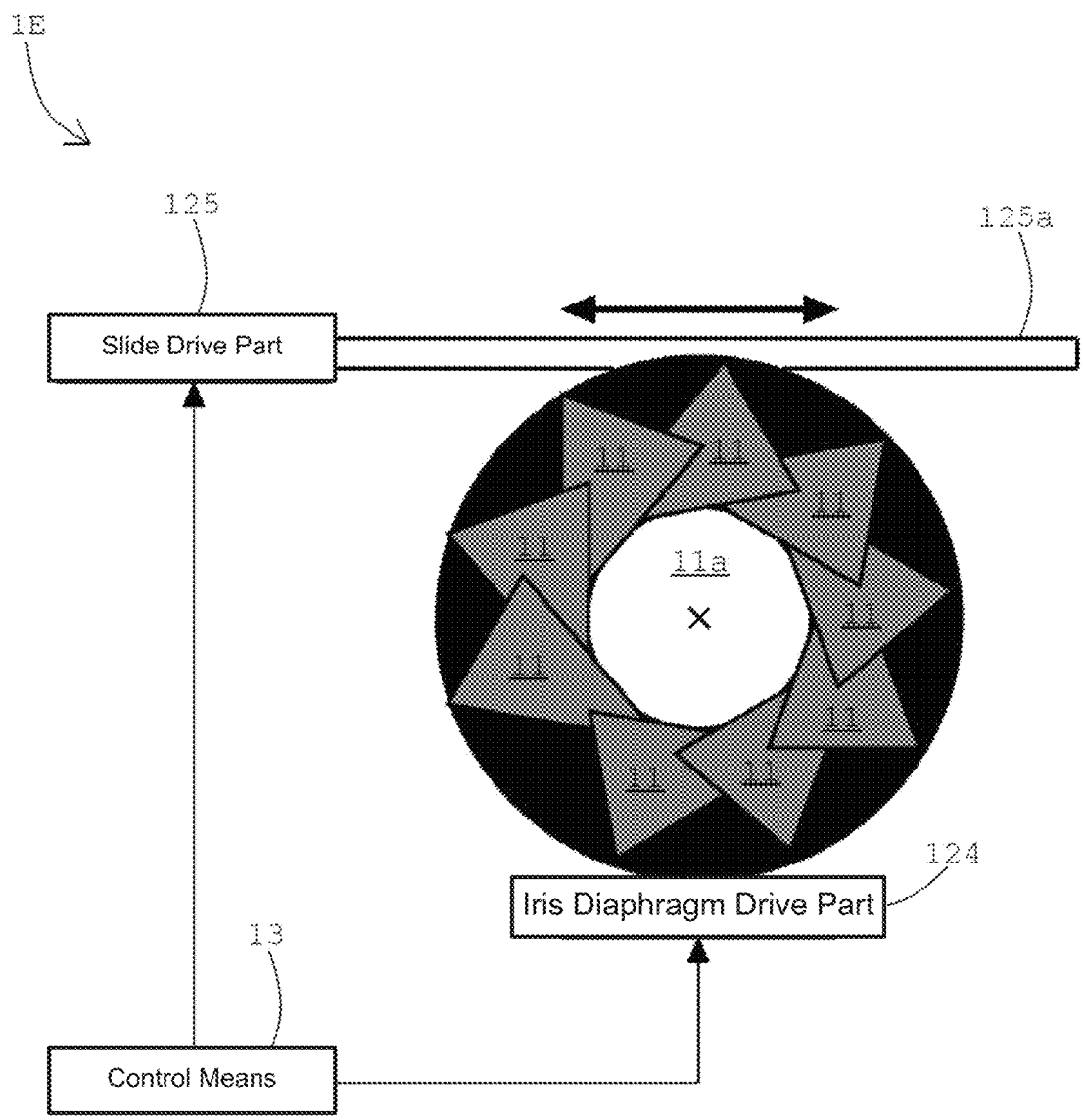
FIG. 10 is a diagram showing Example 5 of the ghost reducing device of this invention.

The characteristic of a ghost reducing device 1E in this Example 5 is, as shown in FIG. 10, that its whole iris diaphragm structure provided with multiple diaphragm blades 11 is configured in a slidable manner. In this Example 5, the diaphragm blades 11 are disposed in point symmetry with respect to the optical axis and configured so that all the diaphragm blades 11 can freely rotate in the inward-outward direction by the same drive amount. Also, they are disposed so that the center of an opening circle 11b of an iris diaphragm coincides with the optical axis in a prescribed reference position mentioned below. Furthermore, all the diaphragm blades 11 are unitized as an iris diaphragm structure, and the whole unit is configured movable by sliding along a guide rail 125a installed in a direction perpendicular to the optical axis.

In this Example 5, as shown in FIG. 10, a diaphragm blade drive means 12 is configured of an iris diaphragm drive part 124 that drives the diaphragm blades 11 as an iris diaphragm, and a slide drive part 125 that slides all the diaphragm blades 11 from the prescribed reference position. In this Example 5, the iris diaphragm drive means 124 drives the individual diaphragm blades 11 in the inward-outward direction and changes the extending amount, thereby adjusting the size of the opening 11a.

Also, as shown in FIG. 10, the slide drive part 125 has the center of the opening circle 11b of the iris diaphragm coincide with the optical axis in its initial state, and that position is set as the reference position. Then, by integrally displacing all the diaphragm blades 11, the position of the opening 11a is adjusted.

A control means 13 independently controls the narrowing-down amount of the diaphragm blades 11 by the iris diaphragm drive part 124 and the sliding amount of the diaphragm blades 11 by the slide drive part 125. In this Example 5, the control means 13 realizes various kinds of states mentioned below based on the presence/absence of a specification on the aperture value and a specification on the ghost reducing function of this invention.

Figure 11:
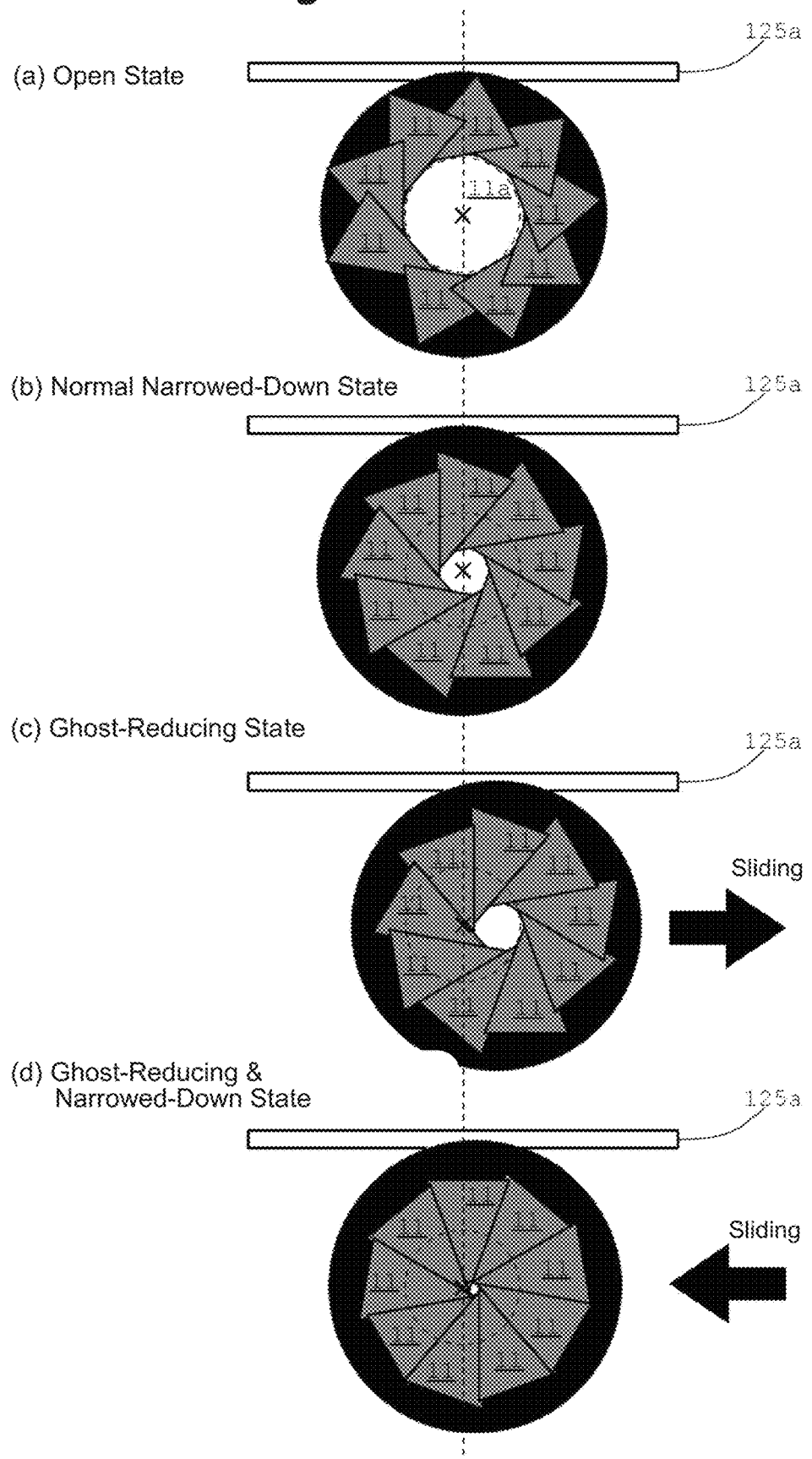
FIG. 11 is diagrams showing (a) the open state, (b) the normal narrowed-down state, (c) the ghost-reducing state, and (d) the ghost-reducing and narrowed-down state in Example 5.

Next, explained are the actions of the ghost reducing device 1E of this Example 5 provided with the above configuration. When there is no need to reduce ghosts because the amount of light is small such as during the night or on a cloudy day, as shown in FIG. 11 (a), the control means 13 does not drive the slide drive part 125, maintaining it in the reference position. On the other hand, the control means 13 lets all the diaphragm blades 11 retreat to the outermost side by the iris diaphragm drive part 124 to set the opening 11a to an open state where it is maximally opened. Thereby, because the amount of light guided onto an imaging element 3 is secured at the maximum, deterioration in image quality is suppressed to the minimum even during the night or on a cloudy day.

Also, when narrowing down from the open state, as shown in FIG. 11 (b), the control means 13 lets the slide drive part 125 maintain the reference position and lets the iris diaphragm drive part 124 move the diaphragm blades 11 in the inward direction (optical axis direction) by the same narrowing-down amount. Thereby, the one opening 11a formed with the diaphragm blades 11 is set to a normal narrowed-down state where it is narrowed down according to the aperture value.

Furthermore, when executing the ghost reducing function, the control means 13 drives the slide drive part 125 in the normal narrowed-down state mentioned above to slide all the diaphragm blades 11 in a direction leaving the reference position. Then, as shown in FIG. 11 (c), once the opening 11a comes off the optical axis and one piece of the diaphragm blades 11 blocks light on the optical axis, the slide drive part 125 is stopped, setting it to a ghost-reducing state. Thereby, because light is totally blocked in the symmetrical position of the opening 11a with respect to the optical axis by the diaphragm blades 11, unnecessary return light from the imaging element 3 is blocked, reducing ghosts.

Also, when further narrowing down from the above-mentioned ghost-reducing state, as shown in FIG. 11 (d), the control means 13 drives the iris diaphragm drive part 124 to move all the diaphragm blades 11 in the inward direction (optical-axis direction) according to the narrowing-down amount. Also, the control means 13 obtains the distance that the diaphragm blades 11 moved inward by the iris diaphragm drive part 124, and drives the slide drive 125 in the direction of approaching the reference position by that distance, thereby setting it to a ghost-reducing and narrowed-down state. At this time, because light is still totally blocked in the symmetrical position to the opening 11a, the ghost reducing function is maintained. Also, because the center of the opening 11a approaches the optical axis, aberration due to ambient light is reduced.

According to this Example 5 above, it has been demonstrated that by the ghost reducing device 1E that can perform such a control that the whole iris diaphragm structure is slided, ghosts can be effectively reduced in a situation where ghosts can easily occur, and deterioration in image quality can be suppressed in a situation where ghosts can hardly occur.

Note that although in this Example 5, the slide drive part 125 slides also the iris diaphragm drive part 124 along with the iris diaphragm structure, this invention is not limited to this configuration. That is, it only needs to be configured so that at least the diaphragm blades 11 as the whole is slidable from the reference position without sliding the iris diaphragm drive part 124.

Note that the ghost reducing device 1 and the imaging device 10 provided with it, the ghost reducing method, and the imaging optical system 2 of this invention are not limited to the above-mentioned embodiments or examples but can be modified as appropriate.

For example, in this embodiment mentioned above, it is presumed that the imaging device 10 of this invention is applied to a digital video camera, and the imaging optical system 2 of this invention is applied to an imaging optical system built in the digital video camera. However, the scope of application of this invention is not limited to the above, but it can be widely applied to imaging optical systems built in various kinds of cameras such as digital still cameras, film cameras, and cameras built in smartphones, tablets, etc., and imaging devices provided with these imaging optical systems.

DESCRIPTION OF REFERENCE NUMERALS

1: Ghost reducing device
1A: Ghost reducing device (Example 1)
1B: Ghost reducing device (Example 2)
1C: Ghost reducing device (Example 3)
1D: Ghost reducing device (Example 4)
1E: Ghost reducing device (Example 5)
2: Imaging optical system
3: Imaging element
10: Imaging device
11: Diaphragm blades
11a: Opening
11b: Opening circle
12: Diaphragm blade drive means
13: Control means
21: Front lens group
22: Diaphragm
23: Rear lens group
111: First diaphragm blade
111a: Opening window
111b: Cut-out
112: Second diaphragm blade
112a: Opening window
112b: Cut-out
113: First diaphragm blade group
114: Second diaphragm blade group
115: Third diaphragm blade group
121: First drive part
122: Second drive part
123: Third drive part
124: Iris diaphragm drive part
125: Slide drive part
125a: Guide rail

What is claimed is:

1. A ghost reducing device, comprising:
multiple diaphragm blades that are formed in a vicinity of a pupil position in an imaging optical system and form at least one opening that lets light pass through,
a diaphragm blade drive means that drives the diaphragm blades to adjust a size and/or a position of the at least one opening, and
a control means that controls the driving of the diaphragm blades by the diaphragm blade drive means, wherein
when reducing ghosts, the control means controls the driving of the diaphragm blades so that the at least one opening formed by the diaphragm blades does not overlap an optical axis of the imaging optical system and that the diaphragm blades totally block the light in a symmetrical position to the at least one opening with respect to the optical axis of the imaging optical system.

2. The ghost reducing device according to claim 1, wherein
the multiple diaphragm blades
comprise a first diaphragm blade and a second diaphragm blade overlapping each other,
form the opening with opening windows or cut-outs installed on both of them, and
are disposed so that a center of the opening coincides with the optical axis when the opening is maximally opened,
the diaphragm blade drive means comprises a first drive part that drives the first diaphragm blade and a second drive part that drives the second diaphragm blade, and
when reducing ghosts, the control means controls the first drive part and the second drive part independently, and controls the driving so that one of the first diaphragm blade and the second diaphragm blade blocks light on the optical axis.

3. The ghost reducing device according to claim 1, wherein
the multiple diaphragm blades are configured in an iris diaphragm structure provided with multiple diaphragm blade groups comprising multiple diaphragm blades, and are disposed so that a center of its opening circle of the iris diaphragm coincides with the optical axis,
the diaphragm blade drive means is provided with diaphragm blade group drive parts, each of which drives all the diaphragm blades belonging to the diaphragm blade group, and
when reducing ghosts, the control means controls the diaphragm blade group drive parts independently, and controls the driving so that at least one group of the diaphragm blade groups blocks the light on the optical axis.

4. The ghost reducing device according to claim 1, wherein
the multiple diaphragm blades are configured in an iris diaphragm structure, and are disposed so that a center of its opening circle coincides with the optical axis when the iris diaphragm is maximally opened,
the diaphragm blade drive means comprises a diaphragm blade drive part that individually gives different drive amounts to the diaphragm blades, and
when reducing ghosts, the control means controls the driving so that a center of the opening comes to a position off the optical axis when the iris diaphragm is narrowed down, and one piece of the diaphragm blades blocks the light on the optical axis.

5. The ghost reducing device according to claim 1, wherein
the multiple diaphragm blades are configured in an iris diaphragm structure, and are disposed so that a center of the opening circle of the iris diaphragm coincides with the optical axis in a prescribed reference position,
the diaphragm blade drive means comprises
an iris diaphragm drive part that drives the diaphragm blades as an iris diaphragm, and
a slide drive part that slides all the diaphragm blades from the reference position, and
when reducing ghosts, the control means controls the iris diaphragm drive part to narrow down the opening, and controls the driving of the slide drive part so that one of the diaphragm blades blocks the light on the optical axis.

6. An imaging device provided with the ghost reducing device according to claim 1.

7. A ghost reducing method, comprising:
driving multiple diaphragm blades to form at least one opening to let light pass through, the multiple diaphragm blades being disposed in a vicinity of a pupil position in an imaging optical system,
driving the diaphragm blades to adjust a size and/or a position of the at least one opening so that the at least one opening does not overlap an optical axis of the imaging optical system, and to block totally a symmetrical position to the at last one opening with respect to the optical axis of the imaging optical system.

8. An imaging optical system that forms an image of light from a subject through a lens onto an imaging element, comprising:

multiple diaphragm blades that form at least one opening to let the light pass through and that are disposed in a vicinity of a pupil position in the imaging optical system, and when reducing ghosts, adjust a size and/or a position of the at least one opening so that the at least one opening does not overlap an optical axis of the imaging optical system, and block the light totally in a symmetrical position to the at least one opening with respect to the optical axis of the imaging optical system.

9. The ghost reducing device according to claim 1, wherein an area of the diaphragm blades disposed in the symmetrical position to the at least one opening with respect to the optical axis of the imaging optical system is configured to totally block light that passes through the at least one opening and that is reflected by an imaging element.

10. The ghost reducing method according to claim 7, wherein an area of the diaphragm blades disposed in the symmetrical position to the at least one opening with respect to the optical axis of the imaging optical system is configured to totally block light that passes through the at least one opening and that is reflected by an imaging element.

11. The imaging optical system according to claim 8, wherein an area of the diaphragm blades disposed in the symmetrical position to the at least one opening with respect to the optical axis of the imaging optical system is configured to totally block light that passes through the at least one opening and that is reflected by the imaging element.

\* \* \* \* \*